United States Patent
Jeong et al.

(10) Patent No.: US 12,136,518 B2
(45) Date of Patent: Nov. 5, 2024

(54) MULTILAYER ELECTRONIC COMPONENT INCLUDING COVER LAYER HAVING INSULATING AND CONDUCTIVE PORTIONS

(71) Applicant: SAMSUNG ELECTRO-MECHANICS CO., LTD., Suwon-si (KR)

(72) Inventors: Do Young Jeong, Suwon-si (KR); Jin Mo Ahn, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 102 days.

(21) Appl. No.: 17/981,851

(22) Filed: Nov. 7, 2022

(65) Prior Publication Data

US 2023/0215627 A1    Jul. 6, 2023

(30) Foreign Application Priority Data

Dec. 31, 2021    (KR) .......................... 10-2021-0194175

(51) Int. Cl.
*H01G 4/224*    (2006.01)
*H01G 4/232*    (2006.01)
*H01G 4/30*    (2006.01)

(52) U.S. Cl.
CPC ............. *H01G 4/224* (2013.01); *H01G 4/232* (2013.01); *H01G 4/2325* (2013.01); *H01G 4/30* (2013.01)

(58) Field of Classification Search
CPC ......... H01G 4/30; H01G 4/2325; H01G 4/224
See application file for complete search history.

(56) References Cited

U.S. PATENT DOCUMENTS

| 10,361,035 | B1 * | 7/2019 | Song | ..................... H01G 4/1227 |
| 2016/0212850 | A1 * | 7/2016 | Kainuma | ............. H10N 30/877 |
| 2016/0307700 | A1 | 10/2016 | Park | |
| 2018/0144868 | A1 * | 5/2018 | Park | ....................... H05K 1/181 |
| 2019/0069410 | A1 * | 2/2019 | Byun | ..................... H01G 4/002 |
| 2019/0385795 | A1 * | 12/2019 | Yang | ..................... H01G 4/30 |
| 2020/0066444 | A1 * | 2/2020 | Yang | ..................... H01G 4/232 |
| 2020/0090871 | A1 * | 3/2020 | Ahn | ....................... H01G 4/30 |
| 2020/0365326 | A1 | 11/2020 | Masunari | |

FOREIGN PATENT DOCUMENTS

| CN | 110265216 A | * | 9/2019 | ............ H01G 2/065 |
| JP | 10284343 A | * | 10/1998 | ............ H01G 4/005 |
| JP | 2016-208011 A | | 12/2016 | |
| JP | 2020150070 A | * | 9/2020 | |
| KR | 10-2020-0132687 A | | 11/2020 | |

* cited by examiner

Primary Examiner — David M Sinclair
(74) Attorney, Agent, or Firm — MORGAN, LEWIS & BOCKIUS LLP

(57) ABSTRACT

A multilayer electronic component may include a cover layer disposed on a first surface of a body and extending onto a first band portion of a first external electrode and a second band portion of a second external electrode, in which the cover layer includes an insulating portion disposed between the first external electrode and the second external electrode and including an insulating material, a first conductive portion connected to the insulating portion and disposed on the first band portion, and a second conductive portion connected to the insulating portion and disposed on the second band portion, and the first and second conductive portions include a conductive metal and a resin.

20 Claims, 8 Drawing Sheets

MULTILAYER ELECTRONIC COMPONENT INCLUDING COVER LAYER HAVING INSULATING AND CONDUCTIVE PORTIONS

CROSS-REFERENCE TO RELATED APPLICATION

This application claims benefit of priority to Korean Patent Application No. 10-2021-0194175 filed on Dec. 31, 2021 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), a multilayer electronic component, is a chip-type condenser mounted on the printed circuit boards of various electronic products such as display devices including liquid crystal displays (LCDs) and plasma display panels (PDPs), computers, smartphones, cell phones, and the like, to allow electricity to be charged therein and discharged therefrom.

An MLCC, which is advantageously compact, ensures high capacitance, facilitates mounting, and may be used as a component of various types of electronic devices. As various electronic devices such as computers and mobile devices have been miniaturized and have been implemented with high power, demand for miniaturization and high capacitance in multilayer ceramic capacitors has increased.

In addition, industry interest in automotive electronic components has recently increased, and multilayer ceramic capacitors used in automotive electronic components require high levels of electrical reliability and impact resistance.

In particular, there is demand for the development of a multilayer ceramic capacitor having excellent flexural strength and durability against deformation of a substrate on which a multilayer ceramic capacitor is mounted.

SUMMARY

An aspect of the present disclosure may provide a multilayer electronic component having improved reliability.

An aspect of the present disclosure may also provide a multilayer electronic component having improved flexural strength characteristics.

An aspect of the present disclosure may also provide a multilayer electronic component having excellent adhesion strength between substrates.

An aspect of the present disclosure may also provide a multilayer electronic component having reduced equivalent series inductance (ESL).

According to an aspect of the present disclosure, a multilayer electronic component may include: a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and a first band portion extending from the first connection portion onto a portion of the first surface; a second external electrode including a second connection portion disposed on the fourth surface and a second band portion extending from the second connection portion onto a portion of the first surface; and a cover layer disposed on the first surface and extending onto the first and second band portions. The cover layer includes an insulating portion disposed between the first external electrode and the second external electrode and including an insulating material, a first conductive portion connected to the insulating portion and disposed on the first band portion, and a second conductive portion connected to the insulating portion and disposed on the second band portion, and the first and second conductive portions include a conductive metal and a resin.

According to another aspect of the present disclosure, a multilayer electronic component may include: a body including a dielectric layer and first and second internal electrodes alternately disposed with the dielectric layer interposed therebetween in a first direction; a first external electrode and a second external electrode disposed on two opposing surfaces of the body, respectively; a cover layer disposed on a first surface of the body, which connects the two opposing surfaces of the body to each other, and extending onto portions of the first and second external electrodes. The cover layer includes an insulating portion disposed on a portion of the first surface of the body, and first and second conductive portions extending from opposing ends of the insulating portion and disposed on the portions of the first and second external electrodes, respectively, and the cover layer has a recessed portion between the first and second conductive portions in the first direction.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
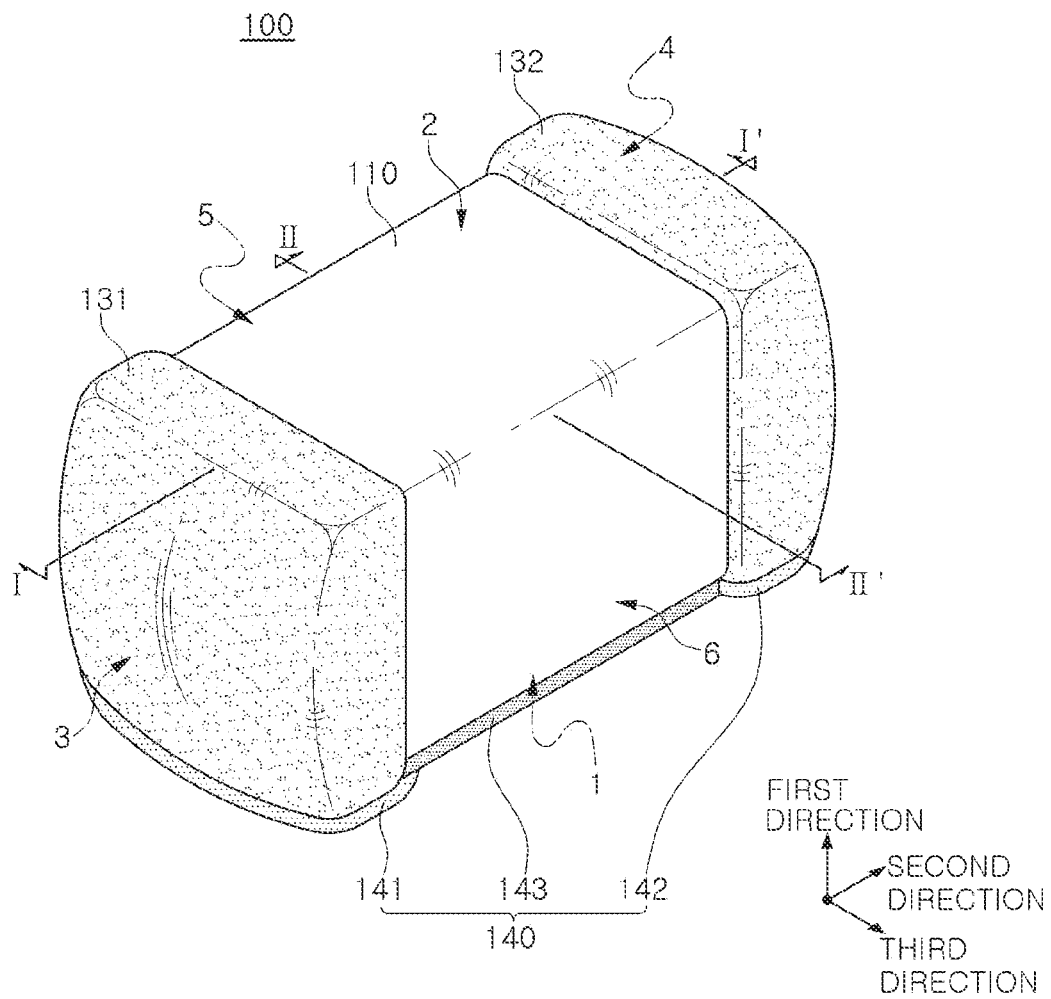
FIG. 1 is a perspective view schematically illustrating a multilayer electronic component according to an exemplary embodiment in the present disclosure.

Exemplary embodiments of the present disclosure will now be described in detail with reference to the accompanying drawings.

In the drawings, a first direction may be defined as a stacking direction or a thickness (T) direction, a second direction may be defined as a length (L) direction, and a third direction may be defined as a width (W) direction.

FIG. 1 is a perspective view schematically illustrating a multilayer electronic component according to an exemplary embodiment in the present disclosure.

Figure 2:
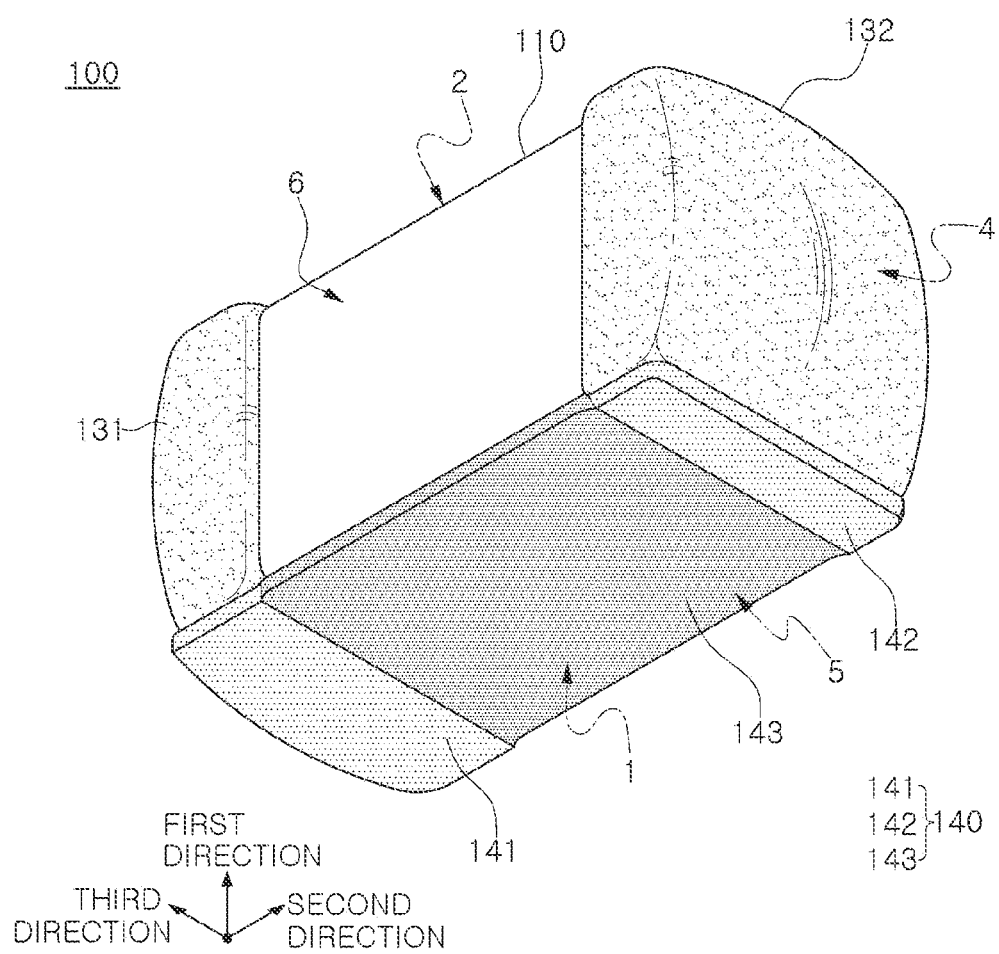
FIG. 2 is a perspective view of the multilayer electronic component of FIG. 1 in another direction.

FIG. 2 is a perspective view of the multilayer electronic component of FIG. 1 in another direction.

Figure 3:
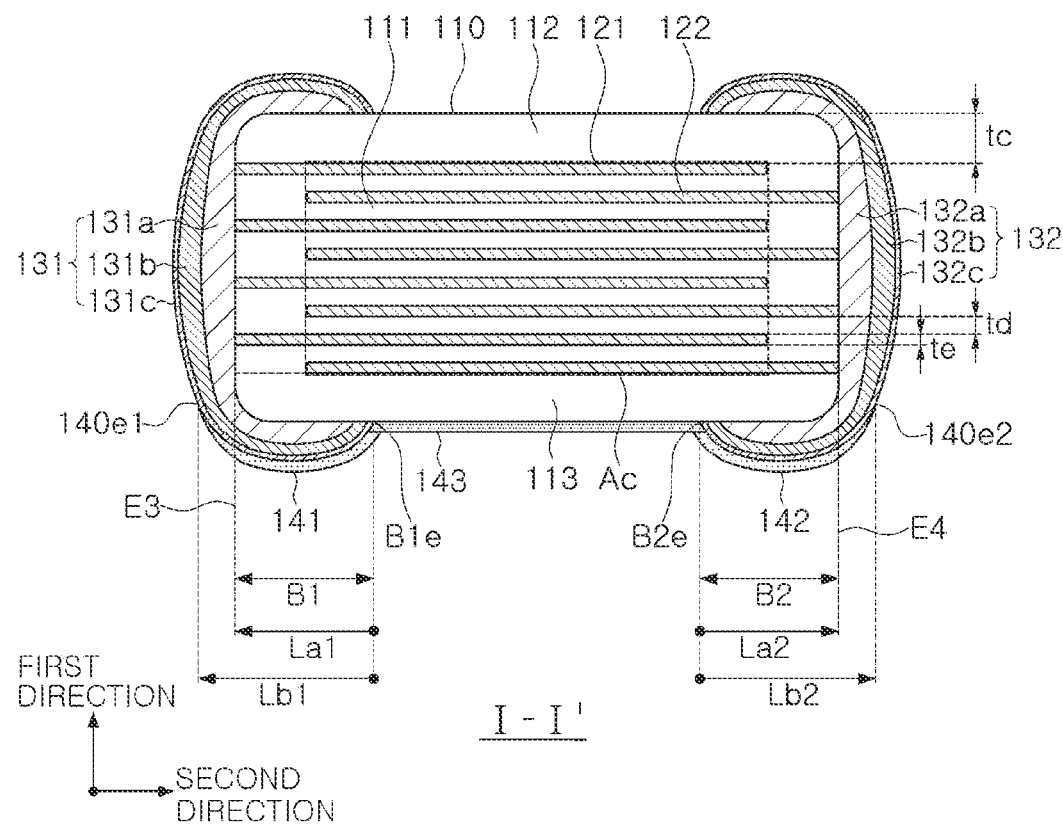
FIG. 3 is a cross-sectional view taken along line I-I' of FIG. 1.

FIG. 3 is a cross-sectional view taken along line I-I' of FIG. 1.

Figure 4:
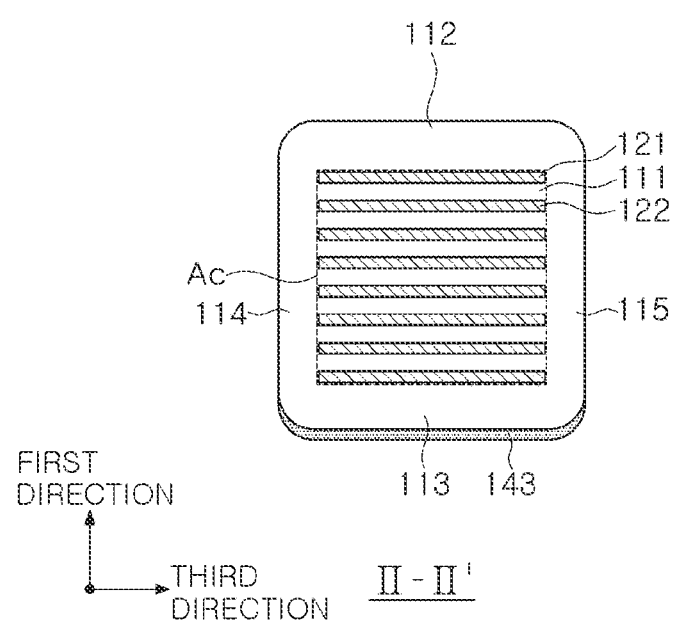
FIG. 4 is a cross-sectional view taken along II-II' of FIG. 1.

FIG. 4 is a cross-sectional view taken along II-II' of FIG. 1.

Figure 5:
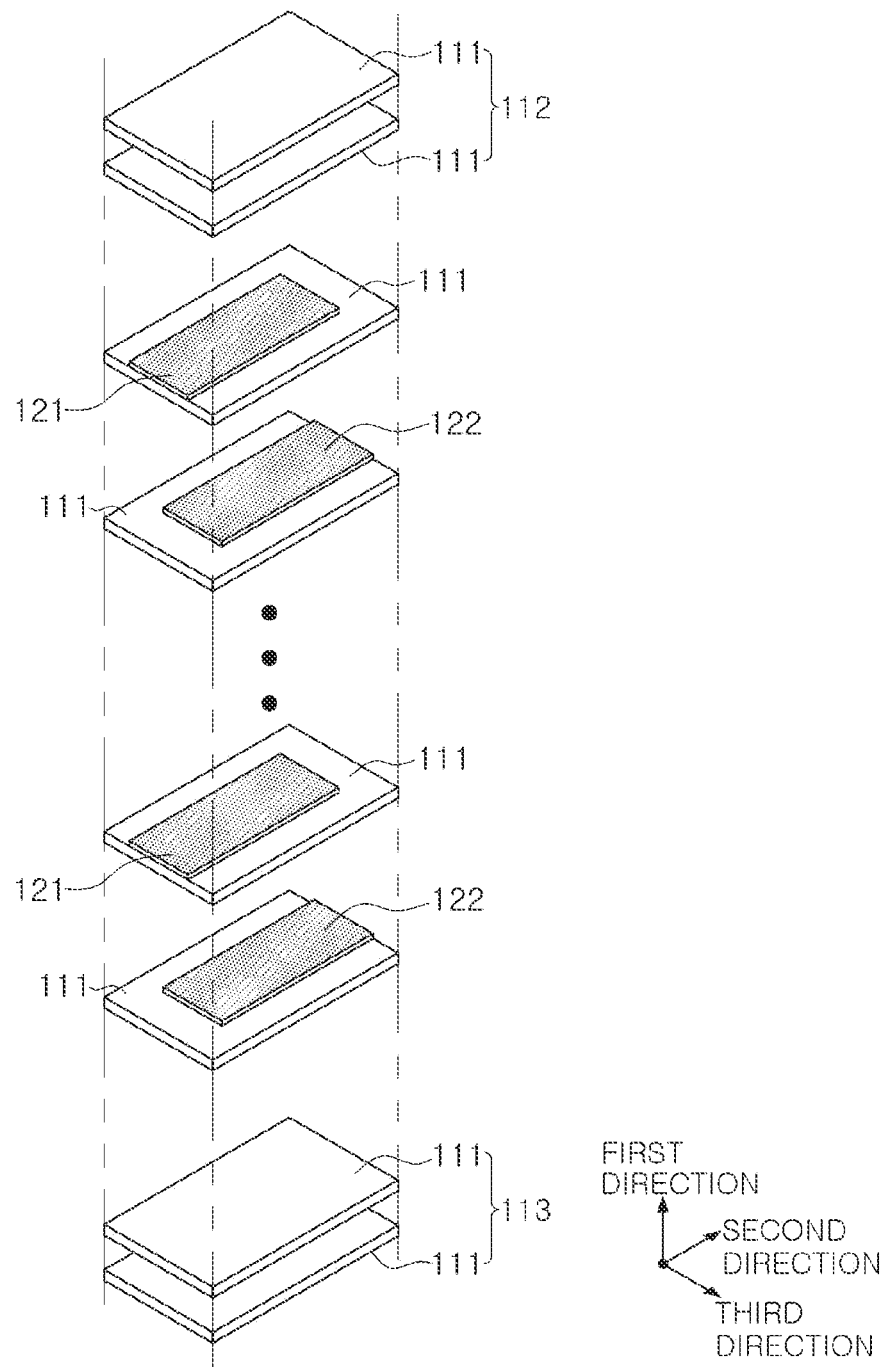
FIG. 5 is an exploded perspective view schematically illustrating a body of FIG. 2.

FIG. 5 is an exploded perspective view schematically illustrating a body of FIG. 2.

Hereinafter, a multilayer electronic component 100 according to an exemplary embodiment in the present disclosure will be described with reference to FIGS. 1 to 5.

A multilayer electronic component 100 according to an exemplary embodiment in the present disclosure may include: a body 110 including a dielectric layer 111 and first and second internal electrodes 121 and 122 alternately disposed with the dielectric layer interposed therebetween and including first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces and opposing each other in a third direction; a first external electrode 131 including a first connection portion disposed on the third surface and a first band portion B1 extending from the first connection portion onto a portion of the first surface; a second external electrode 132 including a second connection portion disposed on the fourth surface and a second band portion B2 extending from the second connection portion onto a portion of the first surface; and a cover layer 140 disposed on the first surface and extending onto the first and second band portions, wherein the cover layer includes an insulating portion 143 disposed between the first external electrode and the second external electrode and including an insulating material, a first conductive portion 141 connected to the insulating portion and disposed on the first band portion, and a second conductive portion 142 connected to the insulating portion and disposed on the second band portion, wherein the first and second conductive portions include a conductive metal and a resin.

In the body 110, the dielectric layer 111 and the internal electrodes 121 and 122 are alternately stacked.

There is no particular limitation to a specific shape of the body 110 but, as shown, the body 110 may have a hexahedral shape or a shape similar thereto. Due to contraction (or shrinkage) of ceramic powder particles included in the body 110 during a firing process, the body 110 may have a substantially hexahedral shape, but may not have a hexahedral shape with perfectly straight lines.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

In an exemplary embodiment, the body 110 includes a 1-3 corner connecting the first surface and the third surface, a 1-4 corner connecting the first surface and the fourth surface, and a 2-4 corner connecting the second surface and the fourth surface. The 1-3 corner and the 2-3 corner may have a form contracted to the center of the body in the first direction toward the third surface, and the 1-4 corner and the 2-4 corner may have a form contracted to the center of the body in the first direction toward the fourth surface.

As a margin region in which the internal electrodes 121 and 122 are not disposed overlaps the dielectric layer 111, a step difference occurs due to a thickness of the internal electrodes 121 and 122, so that a corner connecting the first surface and the third to fifth surfaces and a corner connecting the second surface and the third to fifth surfaces may have a from contracted toward the center of the body 110 in the first direction with respect to the first surface or the second surface. Alternatively, due to a shrinkage behavior during a sintering process of the body, a corner connecting the first surface 1 and the third to sixth surfaces 3, 4, 5, and 6 and/or the corner connecting the second surface 2 and the third to sixth surfaces 3, 4, 5, and 6 may have a form contracted toward the center of the body 110 in the first direction with respect to the first surface or the second surface. Alternatively, as corners connecting the respective surfaces of the body 110 are rounded by performing a separate process to prevent chipping defects, etc., a corner connecting the first surface and the third to sixth surfaces and/or a corner connecting the second surface and the third to sixth surfaces may have a rounded shape.

The corners may include a 1-3 corner connecting the first surface and the third surface, a 1-4 corner connecting the first surface and the fourth surface, a 2-3 corner connecting the second surface and the third surface, and a 2-4 corner connecting the second surface and the fourth surface. In addition, the corners may include a 1-5 corner connecting the first and fifth surfaces, a 1-6 corner connecting the first surface and the sixth surface, a 2-5 corner connecting the second surface and the fifth surface, and a 2-6 corner connecting the second surface and the sixth surface. The first to sixth surfaces of the body 110 may be generally flat surfaces, and non-flat regions may be considered to be corners. Hereinafter, an extension line of each surface may refer to a line extending based on a flat portion of each surface.

Meanwhile, in order to suppress a step difference caused by the internal electrodes 121 and 122, when margin portions 114 and 115 are formed by performing cutting so that the stacked internal electrodes are exposed to the fifth and sixth surfaces 5 and 6 and then stacking a single dielectric layer or two or more dielectric layers on both side surfaces of a capacitance forming portion Ac in the third direction (the width direction), a portion connecting the first surface and the fifth and sixth surfaces and a portion connecting the second surface and the fifth and sixth surfaces may not have a contracted form.

The plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1).

As a material for forming the dielectric layer 111, various ceramic additives, organic solvents, plasticizers, binders, dispersants, etc. may be added to the powder particles such as barium titanate ($BaTiO_3$) according to purposes of the present disclosure.

Meanwhile, an average thickness td of the dielectric layer 111 does not need to be particularly limited. For example, the average thickness td of the dielectric layer 111 may be 0.2 to 3 μm.

The average thickness td of the dielectric layer 111 may refer to an average thickness of the dielectric layer 111 disposed between the first and second internal electrodes 121 and 122.

The average thickness of the dielectric layer 111 may be measured by scanning an image of a cross-section of the body 110 in a length-thickness direction (L-T) with a scanning electron microscope (SEM) having a magnification of 10,000. More specifically, an average value may be measured by measuring a thickness of one dielectric layer at 30 points at equal intervals in a length direction in the scanned image. The 30 points at equal intervals may be designated in the capacitance forming portion Ac. In addition, if the average value is measured by extending the measurement of the average value to 10 dielectric layers, the average thickness of the dielectric layer may be further generalized.

The body 110 may include the capacitance forming portion Ac disposed inside the body 110 and forming capacitance by including the first internal electrode 121 and the second internal electrode 122 disposed to face each other with the dielectric layer 111 interposed therebetween and cover portions 112 and 113 formed on upper and lower surface of the capacitance forming portion Ac in the first direction.

In addition, the capacitance forming portion Ac is a part contributing to capacitance formation of the capacitor, and may be formed by repeatedly stacking the plurality of first and second internal electrodes 121 and 122 with the dielectric layer 111 interposed therebetween.

The cover portions 112 and 113 include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, the average thickness of the cover portions 112 and 113 does not need to be particularly limited. However, the average thickness tc of the cover portions 112 and 113 may be 15 μm or less in order to more easily achieve miniaturization and high capacitance of the multilayer electronic component.

The average thickness tc of the cover portions 112 and 113 may refer to an average size in the first direction and may be a value obtained by averaging thicknesses of the cover portions 112 and 113 in the first direction measured at five points at equal intervals (or non-equal intervals, alternatively) above or below the capacitance forming portion Ac.

In addition, margin portions 114 and 115 may be disposed on a side surface of the capacitance forming portion Ac.

The margin portions 114 and 115 may include a first margin portion 114 disposed on the fifth surface 5 of the body 110 and a second margin portion 115 disposed on the sixth surface 6 of the body 110. That is, the margin portions 114 and 115 may be disposed on both end surfaces of the ceramic body 110 in the width direction.

As shown in FIG. 4, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region in which the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance forming portion Ac in the third direction (the width direction).

Meanwhile, the widths of the margin portions 114 and 115 do not need to be particularly limited. However, the average width of the margin portions 114 and 115 may be 15 μm or less in order to more easily achieve miniaturization and high capacitance of the multilayer electronic component.

The average width of the margin portions 114 and 115 may refer to an average size of the margin portions 114 and 115 in the third direction, and may be a value obtained by averaging widths of the margin portions 114 and 115 measured at five points at equal intervals (or non-equal intervals, alternatively) in the third direction on a side surface of the capacitance forming portion Ac.

The internal electrodes 121 and 122 are alternately stacked with the dielectric layer 111.

The internal electrodes 121 and 122 may include first and second internal electrodes 121 and 122. The first and second internal electrodes 121 and 122 may be alternately disposed to face each other with the dielectric layer 111 constituting the body 110 interposed therebetween and may be exposed to the third and fourth surfaces 3 and 4 of the body 110, respectively.

Referring to FIG. 3, the first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body to be connected to the first internal electrode 121, and a second external electrode 132 may be disposed on the fourth surface 4 of the body to be connected to the second internal electrode 122.

That is, the first internal electrode 121 is not connected to the second external electrode 132 but is connected to the first external electrode 131, and the second internal electrode 122 is not connected to the first external electrode 131 but is connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently firing the green sheets.

A material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), or alloys thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), or alloys thereof on a ceramic green sheet. As a printing method of the conductive paste for internal electrodes, a screen-printing method or a gravure printing method may be used but the present disclosure is not limited thereto.

Meanwhile, the average thickness te of the internal electrodes 121 and 122 does not need to be particularly limited. For example, the average thickness te of the internal electrodes 121 and 122 may be 0.2 μm to 2 μm.

The average thickness te of the internal electrodes 121 and 122 may refer to an average thickness of the internal electrodes 121 and 122.

The average thickness of the internal electrodes 121 and 122 may be measured by scanning an image of a cross-section of the body 110 in the length-thickness direction (L-T) with a scanning electron microscope (SEM) having a magnification of 10,000. More specifically, the average value may be measured by measuring a thickness of one internal electrode at 30 equal intervals in the length direction in the scanned image. The 30 points at equal intervals may be designated in the capacitance forming portion Ac. In addition, if the average value is measured by extending the measurement of the average value to 10 internal electrodes, the average thickness of the internal electrodes may be further generalized.

The external electrodes 131 and 132 may be disposed on the third surface 3 and the fourth surface 4 of the body 110. The external electrodes 131 and 132 may include first and second external electrodes 131 and 132 disposed on the third and fourth surfaces 3 and 4 of the body 110, respectively, and connected to the first and second internal electrodes 121 and 122, respectively.

The external electrodes 131 and 132 may include a first external electrode 131 including a first connection portion disposed on the third surface and a first band portion B1 extending from the first connection portion onto a portion of the first surface and a second external electrode 132 including a second connection portion disposed on the fourth surface and a second band portion B2 extending from the second connection portion onto a portion of the first surface. In this case, the first band portion B1 may refer to a region of the first external electrode from an extension line E3 of the third surface of the first external electrode to an end B1e of the first band portion, and the second band portion B2 may refer to a region of the second external electrode from an extension line E4 of the fourth surface to an end B2e of the second band portion.

Also, the first external electrode 131 may include a third band portion extending from the first connection portion onto a portion of the second surface, and the second external electrode may include a fourth band portion extending from the second connection portion onto a portion of the second surface. Furthermore, the first external electrode 131 may include a first side band portion extending from the first connection portion to portions of the fifth and sixth surfaces, and the second external electrode may include a second side band portion extending from the second connection portion to portions of the fifth and sixth surfaces.

However, the third band portion, the fourth band portion, the first side band portion, and the second side band portion may not be essential components of the present disclosure. The first and second external electrodes 131 and 132 may not be disposed on the second surface or may not be disposed on the fifth and sixth surfaces. As the first and second external electrodes 131 and 132 are not disposed on the second surface, the first and second external electrodes 131 and 132 may be disposed below an extension line of the second surface of the body. In addition, the first and second connection portions may be disposed to be spaced apart from the fifth and sixth surfaces, and the first and second connection portions may be disposed to be spaced apart from the second surface. In addition, the first and second band portions B1 and B2 may also be disposed to be spaced apart from the fifth and sixth surfaces.

In the present exemplary embodiment, a structure in which the multilayer electronic component 100 has two external electrodes 131 and 132 is described, but the number and shape of the external electrodes 131 and 132 may be changed according to a shape of the internal electrodes 121 and 122 or for other purposes.

Meanwhile, the external electrodes 131 and 132 may be formed using any material as long as the material has electrical conductivity, such as metal, and specific materials may be determined in consideration of electrical characteristics and structural stability, and further may have a multilayer structure.

For example, the external electrodes 131 and 132 include electrode layers 131a, 132a, 131b, and 132b disposed on the body 110 and plating layers 131c and 132c disposed on the electrode layers 131a, 132a, 131b, and 132b.

As a more specific example of the electrode layers 131a, 132a, 131b, and 132b, the electrode layer may be a fired electrode including a conductive metal and glass, or a resin-based electrode including a conductive metal and a resin.

In addition, the electrode layers 131a, 132a, 131b, and 132b may be formed by transferring a sheet including a conductive metal onto the body or by transferring a sheet including a conductive metal onto the fired electrode.

As the conductive metal included in the electrode layers 131a, 132a, 131b, and 132b, a material having excellent electrical conductivity may be used, and the material is not particularly limited. For example, the conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof.

In an exemplary embodiment, the electrode layers 131a, 132a, 131b, and 132b may include first electrode layers 131a and 132a disposed in contact with the body 110 and second electrode layers 131b and 132b disposed on the first electrode layer. The first electrode layers 131a and 132a may include a conductive metal and glass, and the second electrode layers 131b and 132b may include a conductive metal and a resin.

The first electrode layers 131a and 132a include glass and serve to improve bonding strength with the body, and the second electrode layers 131b and 132b include resin to improve flexural strength.

The conductive metal used for the first electrode layers 131a and 132a is not particularly limited as long as it is a material that may be electrically connected to the internal electrodes to form capacitance, and may include one or more selected from the group consisting of, for example, nickel (Ni), copper (Cu), palladium (Pd), silver (Ag), gold (Au), platinum (Pt), tin (Sn), tungsten (W), titanium (Ti), and alloys thereof. The first electrode layers 131a and 132a may be formed by applying a conductive paste prepared by adding a glass frit to the conductive metal powder and then firing.

The conductive metal included in the second electrode layers 131b and 132b serves to be electrically connected to the first electrode layers 131a and 132a.

The conductive metal included in the second electrode layers 131b and 132b may not be particularly limited as long as it is a material that may be electrically connected to the electrode layers 131a and 132a, and may include one or more selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal included in the second electrode layers 131b and 132b may include at least one of a spherical powder particle and a flake powder particle. That is, the conductive metal may be formed of only flake powder particles or only spherical powder particles or may be formed of a mixture of flake powder particles and spherical powder particles. Here, the spherical powder particle may include a form that is not completely spherical, for example, a form in which a length ratio of a major axis and a minor axis (major axis/minor axis) is 1.45 or less. The flake powder particle refers to a powder particle having a flat and elongated shape, in which a length ratio of a major axis and a minor axis (major axis/minor axis) may be 1.95 or more, but is not limited thereto. The lengths of the major axis and the minor axis of the spherical powder particle and flake powder particle may be measured from an image obtained by scanning a cross-section (L-T cross-section) in the first and second directions taken at a central portion of a ceramic electronic component in the third direction with the SEM.

The resin included in the second electrode layers 131b and 132b serves to secure adhesion and absorb shock. The resin included in the second electrode layers 131b and 132b is not particularly limited as long as the resin may have adhesiveness and shock absorption and may be mixed with conductive metal powder to make a paste, and may include, for example, an epoxy-based resin.

In addition, the second electrode layers 131b and 132b may include a plurality of metal particles, an intermetallic compound, and a resin. As the intermetallic compound is included, electrical connectivity with the first electrode layers 131a and 132a may be further improved. The intermetallic compound serves to improve electrical connectivity by connecting a plurality of metal particles, and may serve to surround and connect the plurality of metal particles to each other.

In this case, the intermetallic compound may include a metal having a melting point lower than a curing temperature of the resin. That is, since the intermetallic compound includes a metal having a melting point lower than the curing temperature of the resin, the metal having a melting point lower than the curing temperature of the resin may be melted during a drying and curing process and forms an intermetallic compound with a portion of the metal particles to surround the metal particles. In this case, the intermetallic compound may preferably include a low-melting-point metal of 300 É or less.

For example, the second intermetallic compound may include Sn having a melting point of 213 to 220 É. In the course of drying and curing, Sn is melted and the molten Sn wets the metal particles having a high melting point such as Ag, Ni, or Cu according to a capillary phenomenon and reacts with some of the Ag, Ni, or Cu metal particles to form the second intermetallic compound 133b such as $Ag_3Sn$, $Ni_3Sn_4$, $Cu_6Sn_5$, and $Cu_3Sn$. Ag, Ni, or Cu which has not participated in the reaction remains in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$, or $Cu_3Sn$.

The plating layers 131c and 132c serve to improve mounting characteristics. A type of the plating layers 131c and 132c is not particularly limited, and the plating layers 131c and 132c may be plating layers including one or more of Ni, Sn, Pd, and alloys thereof, and may be formed of a plurality of layers.

As a more specific example of the plating layers 131c and 132c, the plating layers 131c and 132c may be Ni plating layers or Sn plating layers, and the Ni plating layer and the Sn plating layer may be sequentially formed on the electrode layers 131a, 132a, 131b, and 132b, or the Sn plating layer, the Ni plating layer, and the Sn plating layer may be sequentially formed on the electrode layers 131a, 132a, 131b, and 132b. In addition, the plating layers 131c and 132c may include a plurality of Ni plating layers and/or a plurality of Sn plating layers.

The cover layer 140 may be disposed on the first surface of the body 110 and extend on first and second band portions B1 and B2. The cover layer 140 may include an insulating portion 143 disposed between the first external electrode 131 and the second external electrode 132 and including an insulating material, the first conductive portion 141 connected to the insulating portion 143 and disposed on the first band portion B1, and the second conductive portion 142 connected to the insulating portion 143 and disposed on the second band portion B2. As such, the cover layer 140 may have a recessed portion between the first and second conductive portions 141 and 142 in the first direction.

The cover layer 140 may serve to relieve external stress to improve flexural strength characteristics. If the cover layer 140 is disposed only on a region of the first surface of the body 110 in which the first and second band portions B1 and B2 are not disposed, the effect of improving the flexural strength characteristics may be insufficient. Therefore, according to the present disclosure, the cover layer 140 is also disposed on the first and second band portions B1 and B2, and therefore, the flexural strength characteristics may be further improved.

Meanwhile, since the cover layer 140 is also disposed on the first and second band portions B1 and B2, when the entire cover layer 140 has insulating properties, solder bonding with an electrode pad of a substrate is not performed, so adhesion strength may decrease, and since a current path is not formed in the first and second band portions B1 and B2, a current path may be lengthened to increase equivalent series inductance (ESL). Meanwhile, when the entire cover layer 140 has conductive properties, there is a risk that the first external electrode 131 and the second external electrode 132 are electrically connected to each other.

According to an exemplary embodiment in the present disclosure, since the cover layer 140 is disposed between the first external electrode 131 and the second external electrode 132 and includes the insulating portion 143 including an insulating material, the first external electrode may be prevented from being electrically connected to the second external electrode. In addition, since the cover layer 140 includes the first conductive portion 141 connected to the insulating portion 143 and disposed on the first band portion B1 and the second conductive portion 142 connected to the insulating portion 143 and disposed on the second band portion B2, the adhesion strength may be improved, while the effect of improving the flexural strength characteristics is maintained, and a current path is formed in the first and second band portions B1 and B2 to reduce ESL.

The insulating portion 143 is connected to the first and second conductive portions 141 and 142, and since the first conductive portion 141, the insulating portion 143, and the second conductive portion 142 are continuously connected, the cover layer 140 may be disposed as a single layer form.

The first conductive portion 141 and the second conductive portion 142 may include a conductive metal and a resin.

In this case, the conductive metal included in the first conductive portion 141 and the second conductive portion 142 may be a material having excellent electrical conductivity but is not particularly limited. For example, the conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof.

The resin included in the first conductive portion 141 and the second conductive portion 142 serves to secure bonding properties and absorb shock. The resin included in the second electrode layers 131b and 132b is not particularly limited as long as the resin may have adhesiveness and shock absorption and may be mixed with conductive metal powder to make a paste, and may include, for example, an epoxy-based resin.

As the insulating portion 143 includes an insulating material, the insulating portion 143 has insulating properties, improves flexural strength characteristics, and prevents external moisture or a plating solution from penetrating into the body.

In an exemplary embodiment, the insulating portion 143 may include a resin. As the insulating portion 143 includes a resin, bonding strength with the first conductive portion and the second conductive portion may be further strengthened, thereby further improving the flexural strength.

In addition, since the insulating portion 143 includes the same kind of resin as the resin included in the first and second band portions, the bonding strength with the first conductive portion and the second conductive portion may be further strengthened, thereby further improving the flexural strength.

The kind of resin included in the insulating portion 143 does not need to be particularly limited. For example, the insulating portion 143 may include one or more of an epoxy resin, a silicone resin, a fluorine resin, an acrylic resin, and ethyl cellulose.

However, the present disclosure is not limited to the case in which the insulating portion 143 includes a resin, and the insulating portion 143 may include a ceramic material as an insulating material. In this case, the ceramic material included in the insulating portion 143 may be one or more of $TiO_2$, $BaTiO_3$, $Al_2O_3$, $BaO$, $(PbZr_xTi_{1-x}O_3)$ (0<x<1), SiC, MgO, and $SiO_2$.

In an exemplary embodiment, the first and second external electrodes 131 are electrode layers 131a, 132a, 131b, and 132b disposed on the body 110 and plating layers 131c and 132c disposed on the electrode layers 131a, 132a, 131b, and 132b, and the cover layer 140 may be disposed to be in contact with the plating layers 131c and 132c.

In addition, as the plating layers 131c and 132c cover the electrode layers 131a, 132a, 131b, and 132b, the cover layer 140 may be disposed to be spaced apart from the electrode layers 131a, 132a, 131b, and 132b.

In an exemplary embodiment, when an average length from the end B1e of the first band portion to the extension line E3 of the third surface in the second direction is La1 and an average length from the end B1e of the first band portion to the end 140e1 of the cover layer disposed on the first external electrode 131 in the second direction is Lb1, Lb1>La1 may be satisfied. Accordingly, the flexural strength characteristics may be further improved, and when Lb1 is La1 or less, there is a risk that the flexural strength characteristics cannot be sufficiently secured.

Meanwhile, the above characteristics may be equally applied to the end 140e2 of the cover layer disposed on the second external electrode 132. That is, when an average length from the end B2e of the second band portion to the extension line E4 of the fourth surface in the second direction is La1 and an average length from the end B2e of the second band portion to the end 140e2 of the cover layer disposed on the second external electrode 132 in the second direction is Lb2, Lb2>La2 may be satisfied.

La1, Lb1, La2, and Lb2 may be values obtained by averaging values measured at a cross-section (L-T cross-section) taken in the first and second directions at five points at equal intervals in the body 110 in the third direction.

Figure 6:
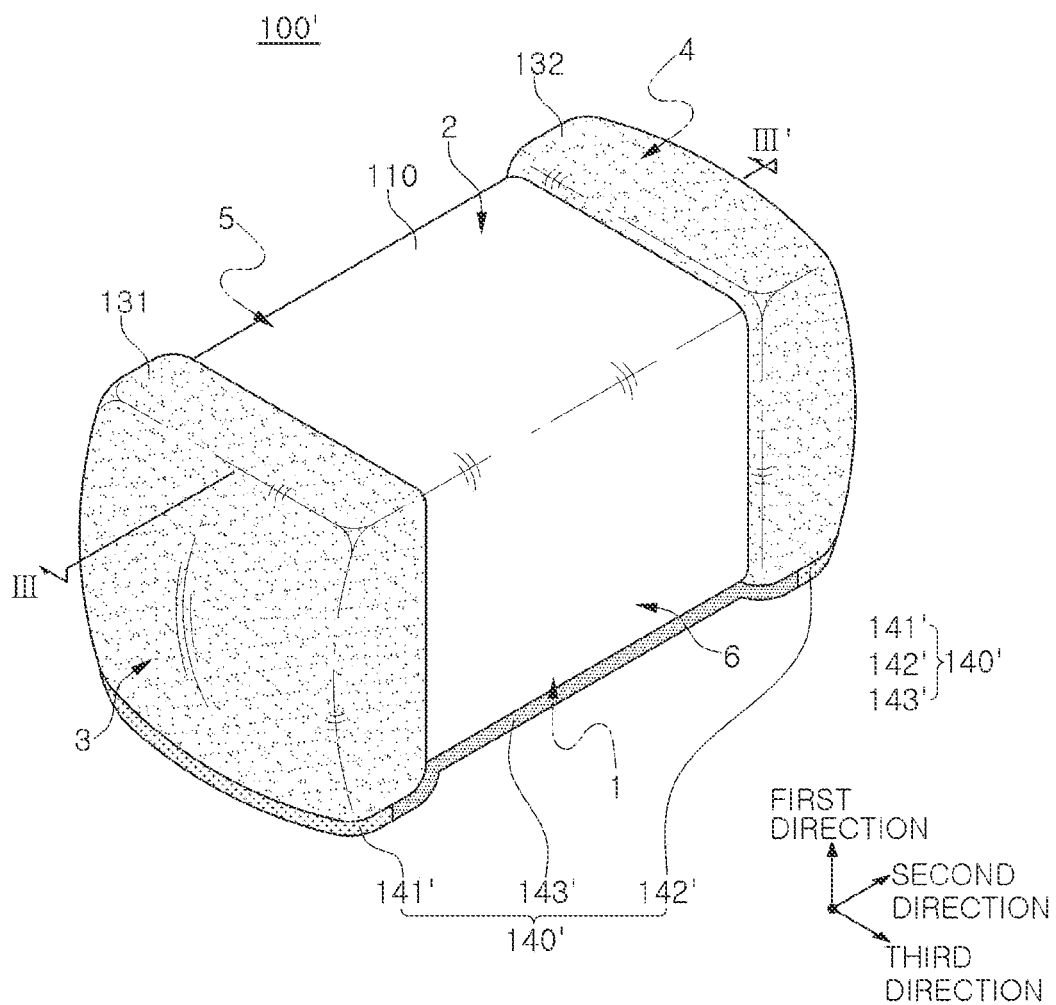
FIG. 6 is a schematic perspective view of a multilayer electronic component according to an exemplary embodiment in the present disclosure.
Figure 7:
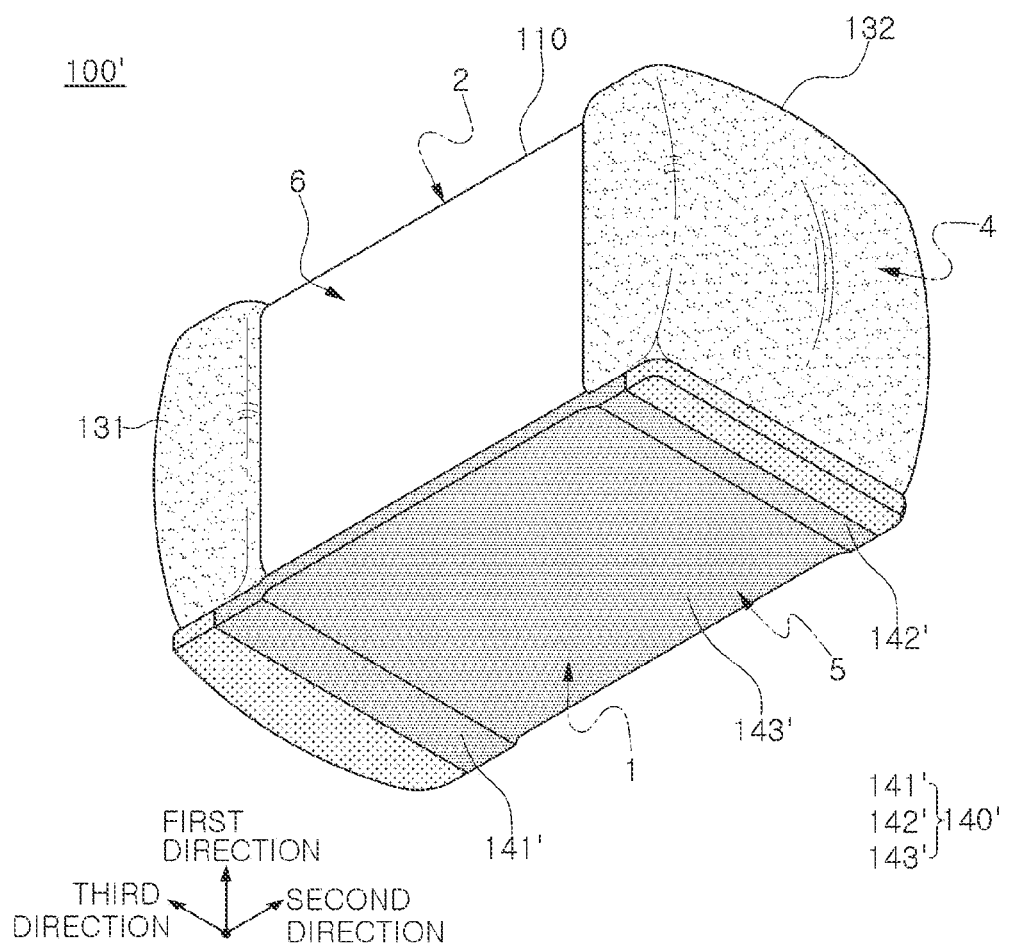
FIG. 7 is a schematic perspective view of the multilayer electronic component of FIG. 6 in another direction.
Figure 8:
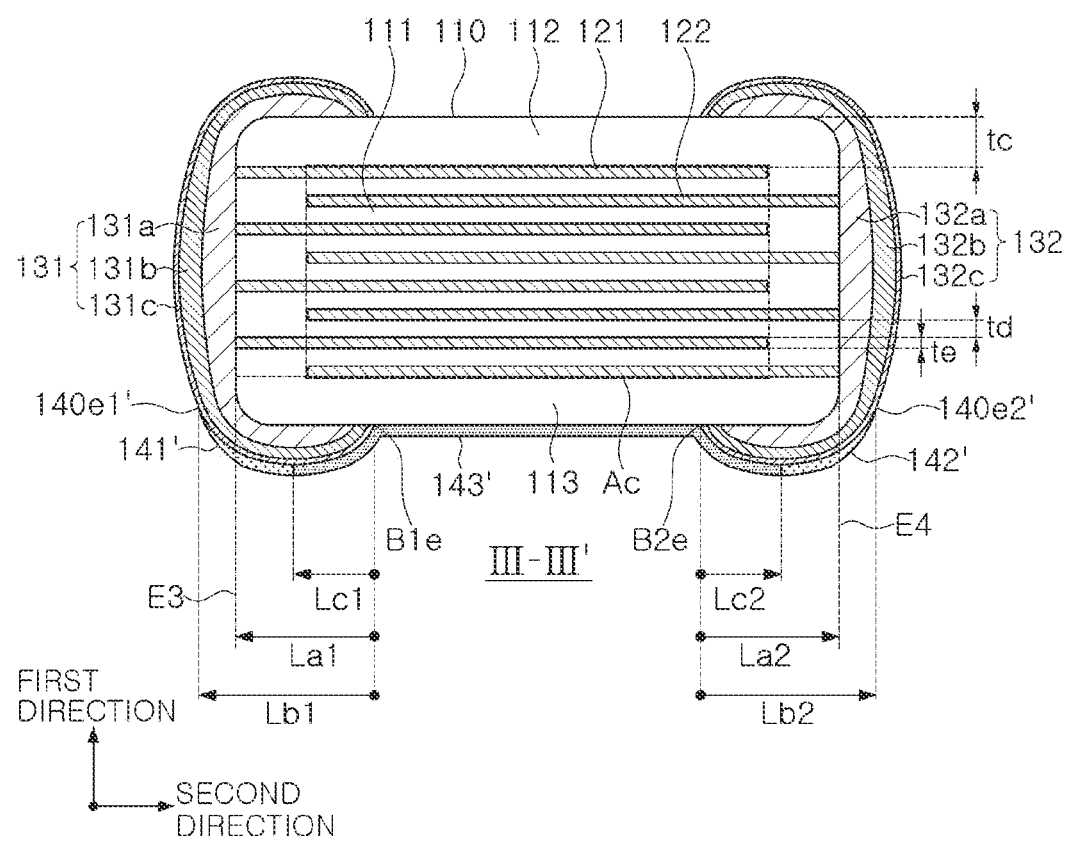
FIG. 8 is a cross-sectional view taken along line III-III' of FIG. 6.

FIG. 6 is a schematic perspective view of a multilayer electronic component 100' according to an exemplary embodiment in the present disclosure. FIG. 7 is a perspective view schematically illustrating the multilayer electronic component 100' of FIG. 6 when viewed from another direction. FIG. 8 is a cross-sectional view taken along line III-III' of FIG. 6.

Referring to FIGS. 6 to 8, in an exemplary embodiment, an insulating portion 143' may be disposed to extend onto the first and second band portions B1 and B2. Accordingly, the adhesion strength with a substrate, ESL and flexural strength characteristics may be adjusted in consideration of the characteristics to be obtained and a use environment of the multilayer electronic component. A first conductive portion 141' may be connected to the insulating portion 143' and may be disposed on a portion of the first band portion B1, and a second conductive portion 142' may be connected to the insulating portion 143' and may be disposed on a portion of the second band portion B2.

In an exemplary embodiment, when an average length from the end B1e of the first band portion to the extension line E3 of the third surface in the second direction is La1 and an average length from the end B1e of the first band portion to the end of the insulating portion 143' disposed on the first external electrode 131 in the second direction is Lc1, La1>Lc1 may be satisfied. If La1 is Lc1 or less, the effect of improving the adhesion strength and the effect of reducing ESL may be insufficient. Therefore, preferably, La is greater than Lc1 (La>Lc1), more preferably, La1 may be 1.2 times or more of Lc1, and even more preferably, La1 may be 1.5 times or more of Lc1.

Similarly, when an average length from the end B2e of the second band to the extension line E4 of the fourth surface in the second direction is La2 and an average length from the end B2e of the second band portion to the end of the insulating portion 143' disposed on the second external electrode 132 in the second direction is Lc2, La2>Lc2 may be satisfied.

In addition, when an average length from the end B1e of the first band portion to an end 140e1' of the cover layer disposed on the first external electrode 131 in the second direction is Lb1, Lb1>La1>Lc1 may be satisfied. Accordingly, the flexural strength characteristics may be further improved, and when Lb1 is La1 or less, there is a risk that the flexural strength characteristics cannot be sufficiently secured.

Similarly, when an average length from the end B2e of the second band portion to the end 140e2' of the cover layer disposed on the second external electrode 132 is Lb2, Lb2>La2>Lc2 may be satisfied.

La1, Lb1, Lc1, La2, Lb2, and Lc2 may be average values of length values measured at a cross-section (LT cross section) taken in the first and second directions at five points at equal intervals (or non-equal intervals, alternatively) of the body 110 in the third direction. In one example, an optical microscope or a scanning electron microscope (SEM) may be used in the measurement, although the present disclosure is not limited thereto. Other measurement methods and/or tools appreciated by one of ordinary skill in the art, even if not described in the present disclosure, may also be used.

One of the various effects of the present disclosure is to improve flexural strength characteristics of the multilayer electronic component by disposing the cover layer on a mounting surface.

One of the various effects of the present disclosure is to improve adhesion strength between the multilayer electronic component and a substrate and improve flexural strength characteristics by disposing the conductive portion on the band portion of the external electrode.

One of the various effects of the present disclosure is to lower ESL of the multilayer electronic component by disposing the conductive portion on the band portion of the external electrode.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface and a first band portion extending from the first connection portion onto a portion of the first surface;
a second external electrode including a second connection portion disposed on the fourth surface and a second band portion extending from the second connection portion onto a portion of the first surface; and
a cover layer disposed on the first surface and extending onto the first and second band portions,
wherein the first and second external electrodes include an electrode layer disposed on the body and a plating layer disposed on the electrode layer,
wherein the cover layer includes an insulating portion disposed between the first external electrode and the second external electrode and including an insulating material, a first conductive portion directly connected to the insulating portion and disposed on the plating layer of the first band portion, and a second conductive portion directly connected to the insulating portion and disposed on the plating layer of the second band portion, and
wherein the first and second conductive portions include a conductive metal and a resin.

2. The multilayer electronic component of claim 1, wherein the insulating portion includes a resin.

3. The multilayer electronic component of claim 2, wherein the resin included in the insulating portion is the same type of resin included in the first and second band portions.

4. The multilayer electronic component of claim 2, wherein the resin included in the insulating portion includes one or more of an epoxy resin, a silicone resin, a fluoro resin, an acrylic resin, or ethyl cellulose.

5. The multilayer electronic component of claim 1, wherein the insulating portion includes a ceramic material.

6. The multilayer electronic component of claim 5, wherein the ceramic material included in the insulating portion includes one or more of $TiO_2$, $BaTiO_3$, $Al_2O_3$, $BaO$, $(PbZr_xTi_{1-x}O_3)$ $(0<x<1)$, SiC, MgO, or $SiO_2$.

7. The multilayer electronic component of claim 1, wherein
the cover layer is disposed to be in contact with the plating layers.

8. The multilayer electronic component of claim 7, wherein the cover layer is disposed to be spaced apart from the electrode layers.

9. The multilayer electronic component of claim 7, wherein
each of the electrode layers includes a first electrode layer disposed to be in contact with the body and a second electrode layer disposed on the first electrode layer, and
the first electrode layer includes a conductive metal and glass, and the second electrode layer includes a conductive metal and a resin.

10. The multilayer electronic component of claim 1, wherein Lb1>La1, in which La1 is an average length from an end of the first band portion to an extension line of the third surface in the second direction, and Lb1 is an average length from the end of the first band portion to an end of the first conductive portion in the second direction.

11. The multilayer electronic component of claim 1, wherein the insulating portion is disposed to extend onto portions of the first and second band portions.

12. The multilayer electronic component of claim 1, wherein La1>Lc1, in which La1 is an average length from an end of the first band portion to an extension line of the third surface in the second direction and Lc1 is an average length from the end of the first band portion to an end of the insulating portion disposed on the first external electrode.

13. The multilayer electronic component of claim 12, wherein Lb1>La1>Lc1, in which Lb1 is an average length from the end of the first band portion to an end of the first conductive portion in the second direction.

14. A multilayer electronic component comprising:
- a body including a dielectric layer and first and second internal electrodes alternately disposed with the dielectric layer interposed therebetween in a first direction;
- a first external electrode and a second external electrode disposed on two opposing surfaces of the body, respectively, the first and second external electrodes include an electrode layer disposed on the body and a plating layer disposed on the electrode layer; and
- a cover layer disposed on a first surface of the body, which connects the two opposing surfaces of the body to each other, and extending onto portions of the first and second external electrodes,
- wherein the cover layer includes an insulating portion disposed on a portion of the first surface of the body, and first and second conductive portions extending from opposing ends of the insulating portion and disposed on the plating layers of the first and second external electrodes, respectively, and
- wherein the cover layer has a recessed portion between the first and second conductive portions in the first direction.

15. The multilayer electronic component of claim 14, wherein the body further includes the first surface and a second surface opposing each other in the first direction, third and fourth surfaces connected to the first and second surfaces and opposing each other in a second direction, and fifth and sixth surfaces connected to the first to fourth surfaces and opposing each other in a third direction.

16. The multilayer electronic component of claim 15, wherein the first external electrode includes a first connection portion disposed on the third surface and a first band portion extending from the first connection portion onto a portion of the first surface, and
- the second external electrode includes a second connection portion disposed on the fourth surface and a second band portion extending from the second connection portion onto a portion of the first surface.

17. The multilayer electronic component of claim 16, wherein the insulating portion is disposed between the first band portion and the second band portion and includes an insulating material, and
- the first and second conductive portions are disposed on the first and second band portions, respectively, and include a conductive metal and a resin.

18. The multilayer electronic component of claim 16, wherein the insulating portion includes a resin, and the resin included in the insulating portion is the same type of resin included in the first and second band portions.

19. The multilayer electronic component of claim 14, wherein the first and second conductive portions are spaced apart from the first surface of the body by the insulating portion.

20. The multilayer electronic component of claim 14, wherein the insulating portion is bent downwardly and extends onto portions of the first and second band portions such that the recessed portion is defined on the insulting portion.

* * * * *